No. 705,845. Patented July 29, 1902.
V. JOHNSON.
AMMONIA SEPARATOR.
(Application filed Mar. 25, 1902.)
(No Model.)
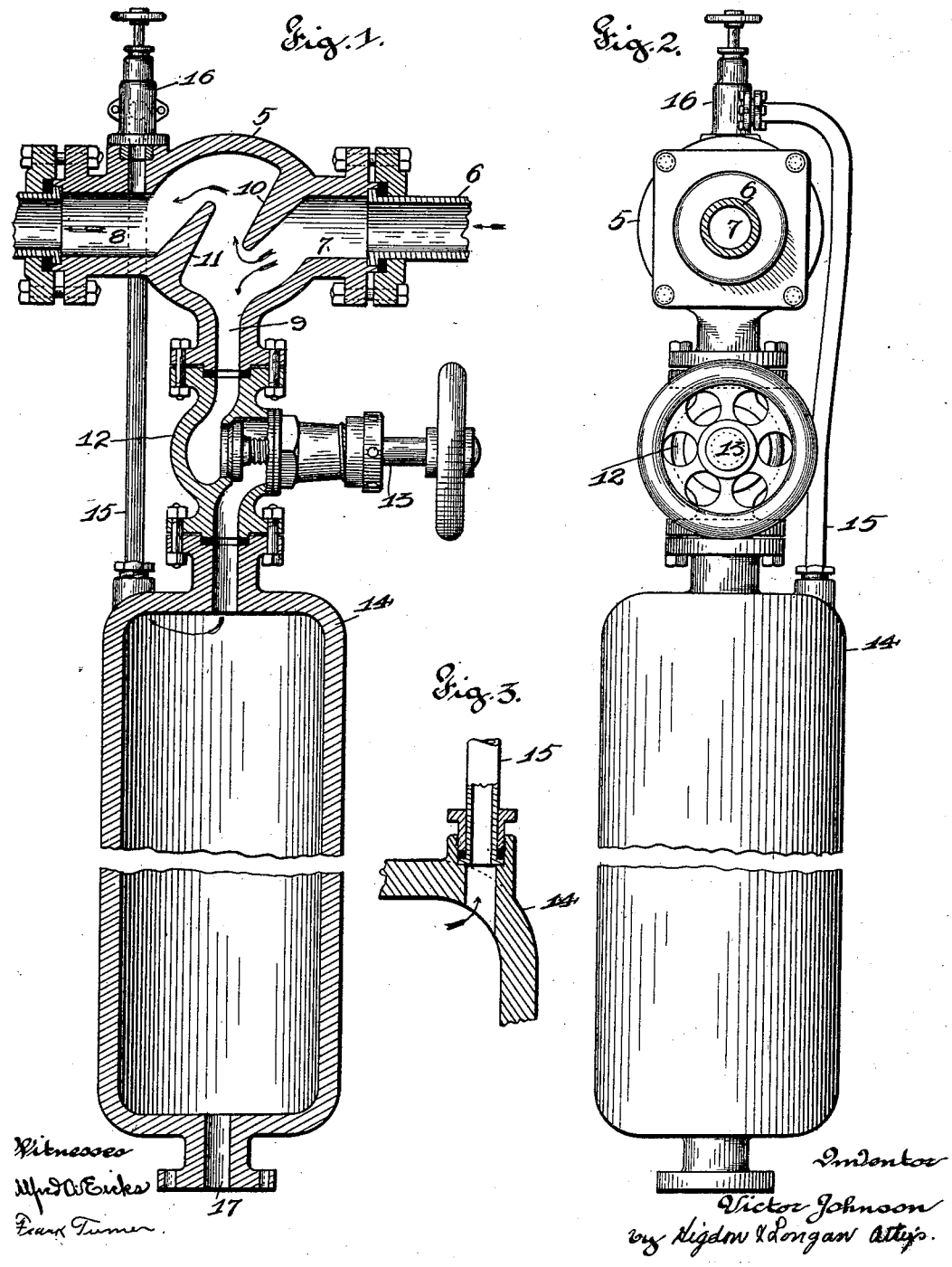

UNITED STATES PATENT OFFICE.

VICTOR JOHNSON, OF ST. LOUIS, MISSOURI.

AMMONIA-SEPARATOR.

SPECIFICATION forming part of Letters Patent No. 705,845, dated July 29, 1902.

Application filed March 25, 1902. Serial No. 99,975. (No model.)

*To all whom it may concern:*

Be it known that I, VICTOR JOHNSON, of the city of St. Louis, State of Missouri, have invented certain new and useful Improvements in Ammonia-Separators, of which the following is a full, clear, and exact description, reference being had to the accompanying drawings, forming a part hereof.

My invention relates to ammonia-separators; and it consists of the novel construction, combination, and arrangement of parts hereinafter shown, described, and claimed.

My object is to construct an ammonia-separator; and my invention consists of the combination, with an ammonia-pipe, of a trap incorporated into the pipe, a branch pipe running downwardly from the trap, a valve in said branch pipe, a receptacle connected to said branch pipe below the valve, a second branch pipe extending upwardly from said receptacle and connected to the top of said trap beyond the first branch pipe, and a valve in said second branch pipe.

Figure 1 is a vertical central section illustrating my invention, parts being broken away to economize space. Fig. 2 is a side elevation of the parts shown in Fig. 1. Fig. 3 is a sectional detail showing the connection of the second branch pipe to the receptacle.

Referring to the drawings in detail, the trap 5 is incorporated into the ammonia-pipe 6, as shown in detail in Fig. 1. The trap comprises a horizontal spherical body or casting, cored to form the inlet-opening 7 and the outlet-opening 8 in horizontal alinement, and the branch outlet-opening 9, extending downwardly half-way between the openings 7 and 8. A baffled wall 10 extends downwardly and backwardly immediately inside of the opening 7, and a similar baffled wall 11 extends upwardly and forwardly immediately in front of the opening 8. The trap 5 serves as a condenser to catch oil and other products of condensation from ammonia-gas as the gas passes through the pipe 6. The drops of oil and other matter will be condensed within the trap 5, run down the inclined surfaces of the baffled walls 10 and 11, and then run down into the branch outlet-opening 9. The trap may be coupled to the sections of the ammonia-pipe in the manner shown or in any suitable manner.

A valve-casing 12 is connected to the lower end of the branch outlet-pipe 9, and the valve 13 controls the passage through said valve-casing. The upper end of the receptacle 14 is connected to the lower end of the valve-casing, so that when the valve is open the products of condensation will pass downwardly through the branch outlet 9, through the valve, and into the receptacle 14. The second branch pipe 15 is connected to the receptacle 14, extends upwardly to a point above the trap 5, then laterally to the valve-casing 16, and said valve discharges downwardly into the trap 5 at a point in front of the first branch pipe and in front of the condensing-chamber. When oil and other products of condensation are passing downwardly into the receptacle 14, any gas which may arise from said products of condensation may pass upwardly through the pipe 15, through the valve 16, and again into the ammonia-pipe 6. The liquid may be drawn from the receptacle 14 through the opening 17, which may be connected to a pipe or controlled in any suitable way.

When it is desired to remove the receptacle 14 for cleaning or for any other purpose, the valves 13 and 16 may be closed and said receptacle 14 removed without discontinuing the operation of passing ammonia through the pipe 6.

I claim—

1. In an ammonia-separator, the trap 5 adapted to be incorporated into the ammonia-pipe; said trap comprising a horizontal spherical body cored to form the inlet-opening 7, and the outlet-opening 8 in horizontal alinement, and the branch outlet-opening 9 extending downwardly half-way between the openings 7 and 8; the baffle-wall 10 extending downwardly and backwardly immediately inside of the opening 7; the baffle-wall 11 extending upwardly and forwardly immediately in front of the opening 8; a receptacle connected to the outlet 9; and a pipe running from the receptacle and communicating with the ammonia-pipe; substantially as specified.

2. In an ammonia-separator, a trap adapted to be incorporated into the ammonia-pipe, and having the baffle-wall 10 extending downwardly and backwardly in the forward part of the trap, and having the baffle-wall 11 extending upwardly and forwardly in the rear part of the trap; a receptacle connected to the trap; a valve controlling the connection; a second connection leading from the receptacle to the ammonia-pipe; and a second valve controlling the second connection; substantially as specified.

In testimony whereof I affix my signature in presence of two witnesses.

VICTOR JOHNSON.

Witnesses:
ALFRED A. EICKS,
M. G. IRION.